United States Patent
Dutch et al.

(10) Patent No.: US 8,676,764 B1
(45) Date of Patent: Mar. 18, 2014

(54) FILE CLUSTER CREATION

(75) Inventors: Michael John Dutch, Saratoga, CA (US); William Dale Andruss, Edina, MN (US); Christopher Hercules Claudatos, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/436,945

(22) Filed: Mar. 31, 2012

(51) Int. Cl.
*G06F 17/30* (2006.01)

(52) U.S. Cl.
USPC .......................................... 707/654

(58) Field of Classification Search
USPC ................................. 707/640, 654
See application file for complete search history.

(56) References Cited

U.S. PATENT DOCUMENTS

| | | | |
|---|---|---|---|
| 5,649,196 A | 7/1997 | Woodhill et al. | |
| 8,065,277 B1 | 11/2011 | Gardner et al. | |
| 8,244,678 B1 | 8/2012 | Hartland et al. | |
| 8,335,768 B1 | 12/2012 | Desai et al. | |
| 2002/0073106 A1* | 6/2002 | Parker et al. | 707/200 |
| 2004/0107357 A1 | 6/2004 | Jeon et al. | |
| 2006/0004868 A1 | 1/2006 | Claudatos et al. | |
| 2006/0218435 A1 | 9/2006 | van Ingen et al. | |
| 2007/0226443 A1* | 9/2007 | Giampaolo | 711/170 |
| 2009/0112878 A1 | 4/2009 | Denny et al. | |
| 2010/0058010 A1 | 3/2010 | Augenstein et al. | |
| 2010/0179943 A1 | 7/2010 | Anand et al. | |
| 2011/0246983 A1 | 10/2011 | Brunet et al. | |

* cited by examiner

*Primary Examiner* — James Trujillo
*Assistant Examiner* — William Spieler
(74) *Attorney, Agent, or Firm* — Theodore A. Chen; Krishnendu Gupta

(57) ABSTRACT

A method, article of manufacture, and apparatus for backing up data. In some embodiments, this includes setting a minimum number of files modified, setting a minimum amount of time elapsed, scanning a computer system for files to backup, determining if there were at least the minimum number of files modified on the computer system within the minimum amount of time elapsed, grouping the files based on the determination, and storing the grouping in a storage device.

3 Claims, 4 Drawing Sheets

FILE CLUSTER CREATION

CROSS REFERENCE TO RELATED APPLICATIONS

This application is related to co-pending U.S. patent application Ser. No. 13/436, 941 for HEURISTIC FILE SELECTION FOR BACKUP and filed concurrently herewith, which is incorporated herein by reference for all purposes, and to co-pending U.S. patent application Ser. No. 13/436,943 for FILE TYPE DATABASES and filed concurrently herewith, which is incorporated herein by reference for all purposes, and to co-pending U.S. patent application Ser. No. 13/436, 946 for HEURISTIC FILE CLUSTER BACKUP and filed concurrently herewith, which is incorporated herein by reference for all purposes.

FIELD OF THE INVENTION

This invention relates generally to processing data, and more particularly to systems and methods for backing up data.

BACKGROUND OF THE INVENTION

Backing up data is a vital function in today's computing environment. With more information being only stored in computer systems, the need to protect against catastrophic data loss is essential.

Conventional methods to backup data include creating a copy of every file and storing the copies in a remote location. This ensures that if an original file is lost or damaged, a backup copy can be recovered and used. However, modern computer systems typically store many large files, and these conventional methods to backup data may not be feasible due to expense or technical reasons.

There is a need, therefore, for an improved method, article of manufacture, and apparatus for backing up data.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
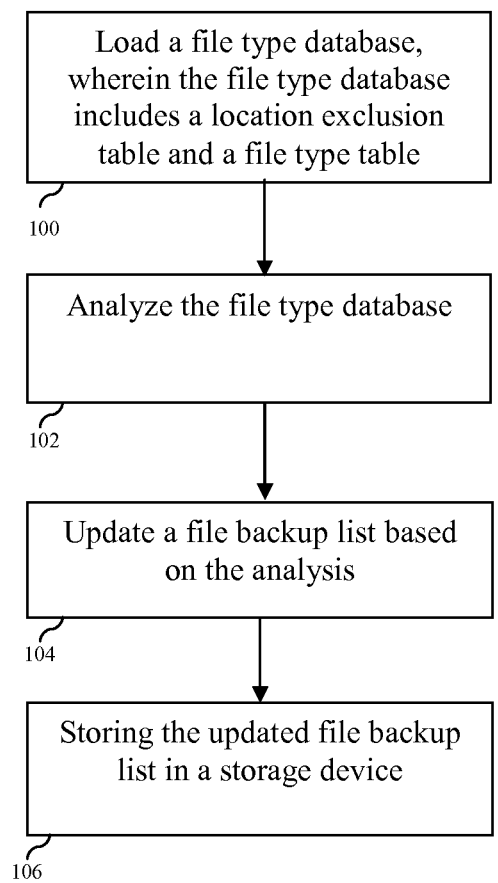
FIG. 1 is a flowchart of a method to backup data in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

A file-level backup application commonly follows either a scheduled backup model or a continuous backup model. The enhanced techniques described herein apply to both models. Continuous backup applications inspect individual files at the instant in time that a file is opened for creation or modification. At this instant, the backup application may place the file in a queue for subsequent copying to a backup repository or may immediately copy the file to a cache for subsequent copying. Scheduled backup operations inspect all files in a file system in order to select a set of these files for copying to a backup repository. The scheduled backup model may copy files without regard to previous backup events or may incrementally copy only files that have been created or modified since a previous backup event. Backup applications based on the scheduled backup model require a backup repository index to determine whether or not a file should be selected for inclusion in an incremental backup set.

At the instant that a file is inspected by any type of backup application, the application determines if the file should be copied to a backup repository. The enhanced techniques described herein accesses the metadata properties assigned to files contained in a file system. File systems have general metadata properties assigned to all files as well as types properties assigned to files based on a specific file type. General metadata properties always include file size, location, creation data and last modification date. Type-specific metadata properties are optional and may indicate properties such as an author name and associated application name. Many of the inclusion and exclusion decisions (e.g. backup or not backup) are based on rules for interpreting the values assigned to metadata properties.

Most backup applications require a user or administrator to setup and configure the application before running backup operations. The setup activity requires a significant knowledge base beyond that of many users. The enhanced techniques described herein simplify the setup by eliminating many complex steps while ensuring that the files with the highest value to the user are protected during backup operations.

Backup operations use a combination of explicitly defined selection rules and heuristic selection rules to select files requiring protection. Selected files are then copied to a backup repository during a backup operation. The backup repository is subsequently available to the user to recover/restore files when necessary. The set of explicitly defined rules can be an empty set at the discretion of the user. In some embodiments, a file type database may store the defined selection rules or heuristic selection rules. A file type database may, in some embodiments, include a location exclusion table and a file type table.

Table 1 below illustrates a location exclusion table in accordance with some embodiments.

TABLE 1

| Location |
| --- |
| C:\Program Files\Paint\Drafts |
| C:\Temp |
| C:\Users\Intern |
| D:\ |

Table 1 includes locations or directories that are to be excluded from being added to the backup list (e.g. directories that are not to be backed up). This table may, in some embodiments, be customized by a user. For example, a system administrator may decide that all files in C:\Temp are never important, and need not be backed up. A backup application need not check the files in C:\Temp, and may save considerable time and bandwidth resources, especially if there are a large number of files or if there is a large amount of data in C:\Temp.

Table 2 below illustrates a file type table in accordance with some embodiments.

TABLE 2

| File Type | Registered? | Always Exclude | Always Include | Include If Rules | Exclude If Rules |
| --- | --- | --- | --- | --- | --- |
| .exe | Yes | | X | | |
| .doc | Yes | | | X | |
| .xls | Yes | | | | X |
| .abc | No | X | | | |

In Table 2, File type ".exe" is registered with the operating system. That is, the operating system knows what application to use when opening file type ".exe." File type ".exe" is always to be included in the backup list (e.g. always backed up). Similarly, File type ".doc" is registered with the operating system. However, unlike ".exe" which is always included, ".doc" is only included if certain rules or conditions are met. For example, .doc files may be included only if its creation or modification date is within the past week. Other conditions may include exceeds a certain file size, or created by a certain user, among others.

Unlike .doc, file type .xls has exclude if rules. That is, if certain rules or conditions are met, .xls files will not be added to the backup list (e.g. not backed up). Such conditions may be similar to the "include if" rules, such as exclude if a certain file size is exceeded, exclude if the file hasn't been modified or accessed within the past week, or exclude if the file was created by a certain user, among others. Combinations of conditions may be used for the "exclude if" and "include if" rules. For example, a rule may be include the file if it was modified yesterday, and its file size does not exceed 10 MB.

In Table 2, file type ".abc" is an unregistered file type. That is, the operating system does not know what application to use when opening the file type. Unregistered file types, in some embodiments, may always be excluded. Generally, unknown file types can be classified as unimportant because those file types are not accessible by any application on the operating system, and thus, not useful to a user. However, there are some cases where a user or system administrator may want to keep an unregistered file type. In such cases, the file type table may be modified by the user or system administrator to include the file type in the backup list as appropriate (e.g. always include, or include if based on some conditions).

In some embodiments, the file type database may be stored in the backup repository (e.g. the target of the backup). In some embodiments, the file type database may be stored on the client (e.g. the source of the backup). In some embodiments, the file type database may be stored on a remote storage device. Further, the file type database may be stored across multiple physical or logical locations. For example, in some embodiments, the file type table may be stored on the client and the location exclusion table may be stored on a remote server.

FIG. 1 illustrates a method to backup data in accordance with some embodiments. In step 100, a file type database is loaded, wherein the file type database includes a location exclusion table and a file type table. In step 102, the file type database is analyzed. In step 104, a file backup list is updated based on the analysis. In step 106, the updated backup list is stored in a storage device. In some embodiments, a file may be scanned prior to loading the database. The file may be scanned for such things as file name, file type, file size, file location and other metadata (e.g. creation date, modification date, type-specific metadata, etc.) Based on the scan, the file may then be compared to the loaded file type database to determine whether or not to add the file to the backup list. For example, if the scan revealed a file to be "IMPORTANT.DOC," in C:\IMPORTANT, the file location was not excluded, and the file type was always included, the file "IMPORTANT.DOC" would be added to the backup list.

Figure 2:
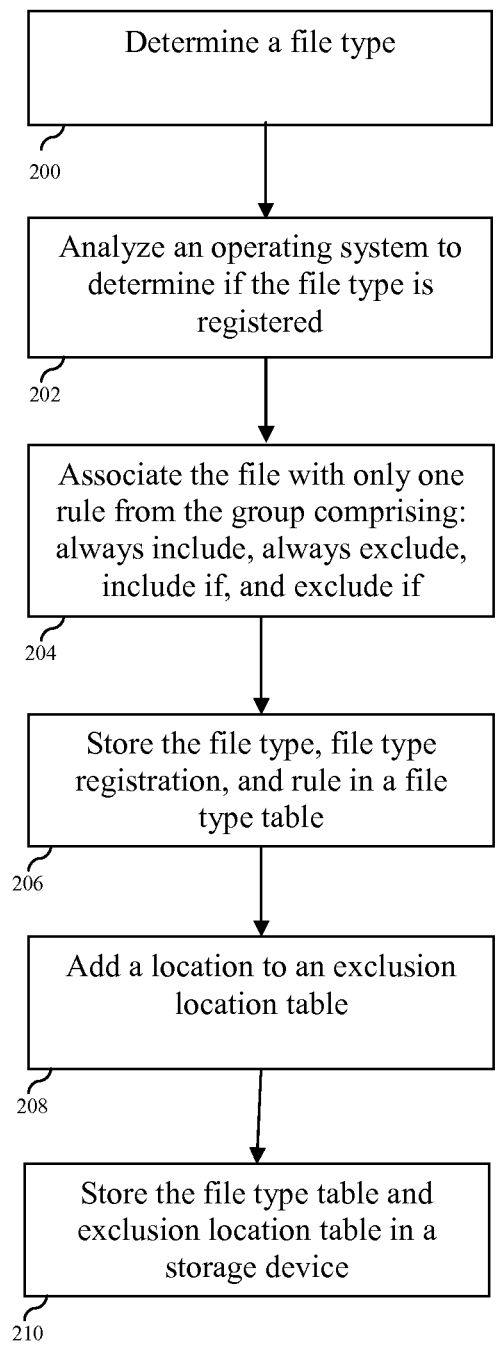
FIG. 2 is a flowchart of a method to create a file type database in accordance with some embodiments.

FIG. 2 illustrates a method to create a file type database in accordance with some embodiments. In step 200, a file type is determined. In step 202, an operating system is analyzed to determine if the file type is registered. In step 204, the file type is associated with only one rule from the group comprising: always include, always exclude, include if, and exclude if. In step 206, the file type, file type registration, and rule are stored in a file type table. In step 208, a location is added to a location exclusion table. In step 210, the file type table and location exclusion table are stored in a storage device.

In some embodiments, a backup application is used to determine a file type. For example, when a backup application scans a client computer, the backup application may discover dozens of file types. The discovered file types may be sent to a database and used to construct the file type database as outlined in FIG. 2. In some embodiments, associating the file type with only one rule may be based on policy. For example, a corporate policy may dictate that all spreadsheets are to be backed up for regulatory reasons. In some embodiments, a user may manually enter into the file table the rule associated with the file type (e.g. always include .abc files, always exclude .def files, etc.). In some embodiments, the file type table and location exclusion table may be stored in different storage devices.

In some embodiments, it may be preferable to defer deciding whether or not to include the file in the backup list, or exclude the file from the backup list. For example, Microsoft Word creates temporary files with the same extension (e.g. ".DOC") when a user is editing a Word document. Though the final saved version of a Word document may be very important based on policy (e.g. always include ".doc" file type), the temporary files generated may be of less importance to users. Temporary files do not exist for a long period of time. If the decision is deferred long enough, the temporary file may no longer exist, and thus no longer need to be backed up. Similarly, a "time from creation" may be used to defer decisions on temporary files. For example, if a temporary file was created on Mar. 31, 2012 at 9:00 pm PST, and the backup application scanned the computer system on Mar. 31, 2012 at 9:01 pm PST, the "time from creation" would be one minute. If a policy dictated that all files with a "time from creation" that is less than 5 minutes shall be deferred, then the temporary file would not be included or excluded from a backup list until later. The deferred time may also be user decided (e.g. a user decides to defer the decision for ten minutes). Once the deferred time has elapsed, the backup application may look for every file with a deferred decision, and determine if the file still exists. If the file exists, then the file may be included in the backup list.

In some embodiments, it may be preferable to group multiple files into a file cluster. For example, system events often create or modify many files in a short period of time. In some cases, the period of time may be so short, and the number of files may be so large, that it would be impossible for a human to perform those changes. A file cluster may be defined, in some embodiments, as "M" files modified in "N" seconds. For example, a system administrator may define that if there were 100 files modified within an elapsed time of 5 seconds, then M=100 and N=5. Suppose that there were 600 files modified by an application in 3 seconds, but the next modification happened at the first minute. In this case, M=600, and N=3 since 600 files were modified in 3 seconds. Thus, the 600 files would be considered a file cluster. There were no other modifications made from the $3^{rd}$ second to the $5^{th}$ second. There was only one modification made at the $60^{th}$ second, which is not included in the file cluster. The cluster may be stored in a cluster database, as shown in below Table 3.

TABLE 3

| Cluster | Files |
|---|---|
| 1 | C:\Temp\File 1 |
|  | C:\Temp\File 2 |
|  | C:\Temp\File 3 |
| 2 | D:\Program\File A |
|  | D:\Program\File B |
| 3 | D:\Temp\File A |
|  | D:\Temp\File B |
|  | C:\Temp\File 4 |

Clusters may be temporal clusters or spatial clusters, or a combination of the two. Temporal clusters include files that were modified within a certain period of time. Spatial clusters include files that were modified in the same location or directory.

Figure 3:
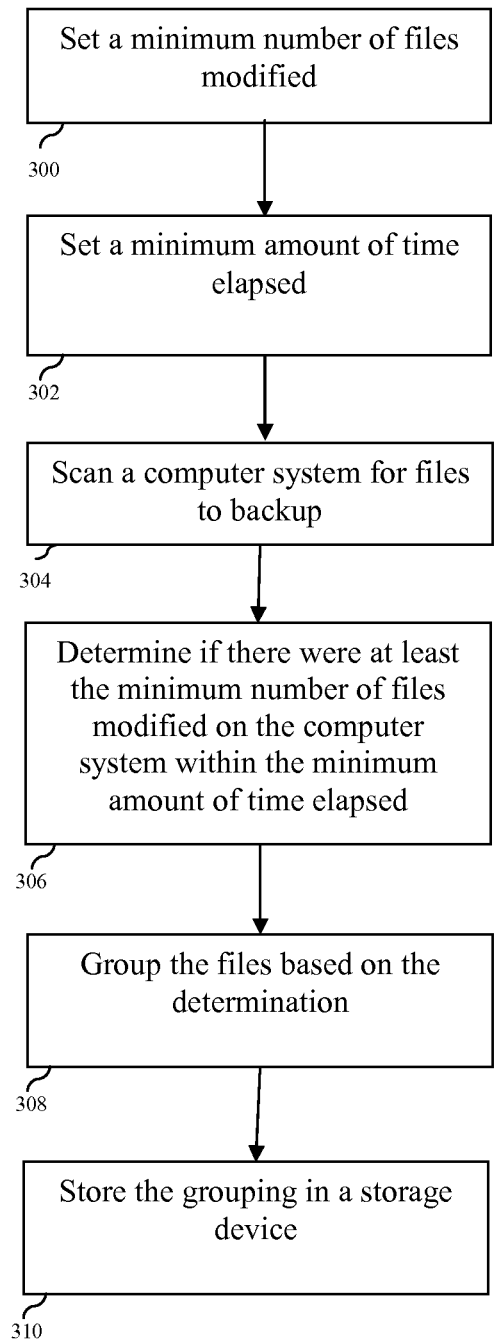
FIG. 3 is a flowchart of a method to create a file cluster in accordance with some embodiments.

FIG. 3 illustrates a method to create a file cluster in accordance with some embodiments. In step 300, a minimum number of files modified is set. In step 302, a minimum amount of time elapsed is set. In step 304, a computer system is scanned for files to backup. In step 306, it is determined if there were at least the minimum number of files modified on the computer system within the minimum amount of time elapsed. In step 308, the files are grouped based on the determination. In step 310, the grouping is stored in a storage device.

Having a file cluster may speed up the backup process. For example, in some embodiments, ".TMP" files are always excluded from a backup list, as described in a file type database. If a file cluster contains at least one .TMP file, it is very likely that the rest of the cluster may include .TMP files since the files were created in a relatively short amount of time. Thus, a system administrator may determine, as a policy, that if a cluster contains just one excluded file type (e.g. ".TMP"), then the whole cluster can be excluded. In this way, the other files in the file cluster need not be scanned once a first .TMP (or other excluded file type) is found. Similarly, a system administrator may decide that, as a policy, if just one "always include" file type is found in the cluster, then the whole cluster can be added to the backup list. There are a wide variety of combinations of how to use clusters. For example, if there are three files of "always include" type, then add the cluster, if there are at least ten files of "always exclude" type, then do not add the cluster, if there is a file of "include if" type, then add the cluster after applying the "include if" rules, etc.

Figure 4:
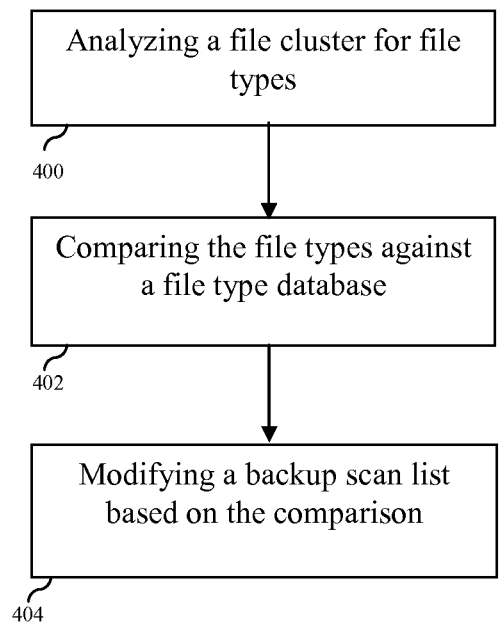
FIG. 4 is a flowchart of a method to backup a file cluster in accordance with some embodiments.

FIG. 4 illustrates a method to backup a file cluster in accordance with some embodiments. In step 400, a file cluster is analyzed for file types. In step 402, the file types are compared against a file type database. In step 404, a backup scan list is modified based on the comparison. In some embodiments, modifying a backup scan list may include adding the file cluster. In some embodiments, modifying a backup scan list may include not adding the file cluster.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for backing up data, the method comprising:
setting a minimum number of files modified;
setting a minimum amount of time elapsed;
scanning a computer system for files to backup;

determining if there were at least the minimum number of files modified on the computer system within the minimum amount of time elapsed;
grouping the files into a cluster based on the determination;
determining that at least one file in the cluster has a file type associated with an always-include rule;
adding all the files in the cluster to a backup list; and
storing all the files in the backup list in a backup repository comprising a storage device.

2. A system for backing up, comprising a storage device and a processor configured to:
set a minimum number of files modified;
set a minimum amount of time elapsed;
scan a computer system for files to backup;
determine if there were at least the minimum number of files modified on the computer system within the minimum amount of time elapsed;
group the files into a cluster based on the determination;
determine that at least one file in the cluster has a file type associated with an always-include rule;
add all the files in the cluster to a backup list; and
store all the files in the backup list in a backup repository comprising a storage device.

3. A computer program product for processing data, comprising a non-transitory computer readable medium having program instructions embodied therein for:
setting a minimum number of files modified;
setting a minimum amount of time elapsed;
scanning a computer system for files to backup;
determining if there were at least the minimum number of files modified on the computer system within the minimum amount of time elapsed;
grouping the files into a cluster based on the determination;
determining that at least one file in the cluster has a file type associated with an always-include rule;
adding all the files in the cluster to a backup list; and
storing all the files in the backup list in a backup repository comprising a storage device.

* * * * *